US006687354B1

United States Patent
Andreason

(10) Patent No.: US 6,687,354 B1
(45) Date of Patent: Feb. 3, 2004

(54) METHOD AND ARRANGEMENT FOR CONNECTION OF A COMPUTER TO A COMPUTER NETWORK VIA A TELEPHONE EXCHANGE

(75) Inventor: Per Tomas Andreason, Tyresö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 655 days.

(21) Appl. No.: 08/828,549

(22) Filed: Mar. 31, 1997

(51) Int. Cl.[7] .......................... H04M 3/00; G06F 15/16
(52) U.S. Cl. ................... 379/198; 379/232; 379/88.25; 709/218; 370/357
(58) Field of Search ............................ 379/114, 88.14, 379/200, 207, 100.14, 199, 93.14, 93.01; 380/49, 23; 364/184; 709/229, 227; 370/352

(56) References Cited

U.S. PATENT DOCUMENTS

| | | | |
|---|---|---|---|
| 5,537,401 A | * 7/1996 | Tadamura et al. | 370/60 |
| 5,610,910 A | * 3/1997 | Focsaneanu et al. | 370/351 |
| 5,742,596 A | * 4/1998 | Baratz et al. | 370/356 |
| 5,764,639 A | * 6/1998 | Staples et al. | 370/401 |
| 5,774,244 A | * 6/1998 | Tandon et al. | 359/125 |
| 5,793,966 A | * 8/1998 | Amstein et al. | 395/200.33 |
| 5,917,897 A | * 6/1999 | Johnson et al. | 379/114 |
| 5,946,386 A | * 8/1999 | Rogers et al. | 379/265 |

FOREIGN PATENT DOCUMENTS

| | | |
|---|---|---|
| EP | 0 291 079 A2 | 11/1988 |
| EP | 0 676 886 A2 | 10/1995 |
| EP | 0 706 279 A1 | 4/1996 |
| EP | 0 716 533 A2 | 6/1996 |
| JP | 63 193630 A | 10/1988 |
| JP | 05 336163 A | 12/1993 |
| JP | 06 245243 A | 9/1994 |
| SE | 9602212-4 | 6/1996 |
| SE | 9602918-6 | 8/1996 |
| SE | 9604409-4 | 11/1996 |
| SE | 9700152-3 | 1/1997 |
| WO | WO 96/20553 | 7/1996 |
| WO | WO 96/31044 | 10/1996 |

OTHER PUBLICATIONS

Newton's Telecom Dictionary, Harry Newton, Flariton Publishing, May 1999.*
Microsoft Computer Dictionary, 3erd Ed., Microsoft Press, Sep. 17, 1997.*
Ref C: Newton's Telecom Dictionary, Newton, H., Flatiron Publishing, 14th Expanded and Updated Ed., Mar., 1998. See: core switch, PBX (private branch exchange), access node, Central Office.*
H. Kaufman, "An Introduction to Distributed Multi–Media Networks", Netspeak Corporation.
"Line Transmission of Non–Telephone Signals, Visuals Telephone Systems and Equipment for Local Area Networks Which Provide a Non–Guaranteed Quality of Service", Draft ITU–T Recommendation H.323, May 28, 1996.
S. Saunders, "PBXs and Data: The Second Time Around", 8178 Data Communications, vol. 2., No. 9, pp. 69–74, Jun. 1993.

* cited by examiner

Primary Examiner—Marc D. Thompson
Assistant Examiner—Beatriz Prieto

(57) ABSTRACT

The present invention refers to a telephone exchange, a telephone system comprising such an exchange as well as a method for connecting a computer to a computer network via an exchange and a telecommunication network, where the exchange comprises a switch core, a switch control means responsible for setting up connections between users of the exchange and at least one network connection device that is connected between the switch core and the computer network. The network connection device comprises a signal processing means that converts the signal structure of data signals, received from computers via the telecommunication network and the switch core, to data packets having a signal structure suitable for data communication and supplies these data packets to the computer network. The exchange comprises means for monitoring every connection set up between such a computer and the computer network.

28 Claims, 3 Drawing Sheets

METHOD AND ARRANGEMENT FOR CONNECTION OF A COMPUTER TO A COMPUTER NETWORK VIA A TELEPHONE EXCHANGE

TECHNICAL FIELD

The present invention relates to the connection of a computer to a computer network via a telephone exchange and more particularly to the monitoring of a connection between a computer and a computer network set up via a private branch exchange.

STATE OF THE ART

Computer networks in the form of internet and intranets are in widespread use and the number of people connecting themselves to computer networks such as the internet is growing increasingly.

There exist however a problem in that people who sit at home and work with computers might want to connect themselves to an intranet or computer network of the company they are employed at via their own telephone connection, and it would be efficient to connect themselves by calling a number of the company exchange and thereby connect themselves to the intranet in order to get hold of for example documents they are working on without having to go to the office or without using an ISP (internet service provider), through which they might not even be able to get connected to the computer network if it is a private network.

When a user has connected himself to a computer network via an ISP and he gets a bad connection, for example by being connected to the computer network via a faulty modem, there is a risk of the faulty modem being used for a long time, because it might not get noticed that it is faulty until the user calls the ISP.

The faulty modem might then not be replaced until the ISP sends a repairman to repair or replace the faulty modem.

WO96/20553 is mainly concerned with a system of transmitting voice mail and electronic mail messages in a computer network. It does however not show any exchange having the internet access point directly without an internet service provider or the direct access from an exchange to a private network.

The telecommunications standard ITU-T H.323 describes different protocols for use in communication between computer and telecommunication networks.

Swedish patent application no SE 9602212-4, filed Jun. 4, 1996, discloses an exchange in a telecommunication network to which a computer is connected via a modem. Calls made to the telephone number associated with the modem are re-routed to a telephone server, for compression, packing into packets and contacting of the computer via internet. The connection between the exchange is a telephone connection. In this case telephone signals are packed into data packets that are then sent on a normal telephone line.

Swedish patent application SE 9604409-4 filed Nov. 29, 1996 discloses a modem which multiplexes telephone signals and data packets on a telephone line so that a user having his computer connected to the PSTN can talk on the telephone while at the same time using the computer via this sole telephone connection.

The Swedish Patent application no SE 9602918-6, filed Aug. 2, 1996, which is identical to US provisional application "Method and Arrangement for Connection Between a Computer Network and a Telecommunication Network", filed Aug. 12, 1996, describes how a user of a computer can connect himself to a computer network via a private branch exchange and a modem. The modem is connected to the switch core of the private branch exchange. The modem comprises some of the functions of the network connection device in this invention. It is however silent about how a faulty modem is to be taken care of.

SUMMARY OF THE INVENTION

The present invention concerns the area of how to allow persons working with computers at home to connect themselves to a computer network without calling a internet service provider and to see to it that such connections are reliable by instead connecting them to the computer network via the company private branch exchange.

When persons working at home are to connect themselves to a computer network of their company via the private branch exchange, there might be problems in that the connections set up might get bad because the device through which they are connected is functioning badly and the exchange is unaware of that fact.

Another problem is that the user might want, once he has properly connected himself to the computer network, try to obtain information to which he is not entitled by the company.

These problems are solved by receiving data signals from the computer, converting the signal structure of the data signals to data packets having a signal structure suitable for data communication and supplying these data packets to the computer network, while at the same time monitoring every connection set up between computers and the computer network.

The object of the invention is thus to provide a telephone, exchange, a telephone system and a method of connecting a computer to a computer network, where persons working with computers at home are allowed to connect themselves to a computer network without calling a internet service provider and to see to it that such connections are reliable and not abused.

This object is achieved by a telephone exchange and a telephone system comprising such an exchange, where the exchange comprises a switch core, a switch control means responsible for setting up connections between users of the exchange and at least one network connection device connected between the switch core and the computer network. The network connection device comprises a signal processing means that converts the signal structure of data signals, received from computers via the telecommunication network and the switch core, to data packets having a signal structure suitable for data communication and supplies these data packets to the computer network. The switch control means comprises means for monitoring every connection set up between computers and the computer network.

This object is also achieved by a method comprising the steps of receiving data signals from the computer, converting the signal structure of the data signals to data packets having a signal structure suitable for data communication and supplying these data packets to the computer network, while at the same time monitoring every connection set up between computers and the computer network.

This object is also achieved by an exchange and a telephone system comprising such an exchange, where the exchange comprises a switch core, a switch control means responsible for setting up connections between users of the exchange and at least one network connection device that is connected between the switch core and the computer network. The network connection device comprises a signal processing means that receives data packets having a signal structure suitable for data communication from the computer network, converts the signal structure of these data packets to a signal structure suitable for communication of data over a telecommunication network and supplies the converted signals to computers via the switch core and the telecommunication network. The exchange comprises means for monitoring every connection set up between such a computer and the computer network.

This object is also achieved by a method comprising the steps of receiving, in the exchange, data packets having a signal structure suitable for data communication from a computer network, converting the signal structure of these data packets to a signal structure suitable for communication of data over a telecommunication network, supplying the converted signals to a computer via a telecommunication network, while at the same time monitoring every connection set up between such a computer and the computer network.

The invention has several advantages. It provides for gathering of data concerning faults in a simple way, through provision of automatic monitoring of connections set up between computers connected to the computer network via the exchange and generation of alarms in case of faults. In this way faulty network connection devices can be monitored, and restarted or replaced by automatic disconnection via the normal monitoring functions of the exchange.

Further advantages are that the computer can be denied access to information it is not allowed to get or to connect itself to certain network address on the computer network it is not allowed to connect itself to via the company.

The monitoring can also be used for traffic measurements such as how many bytes are sent in total via a network connection device and divided onto IP addresses and the time connections are set up as well as to which servers connections have been set up.

DETAILED DESCRIPTION OF PREFERRED EMBODIMENTS

Figure 1:
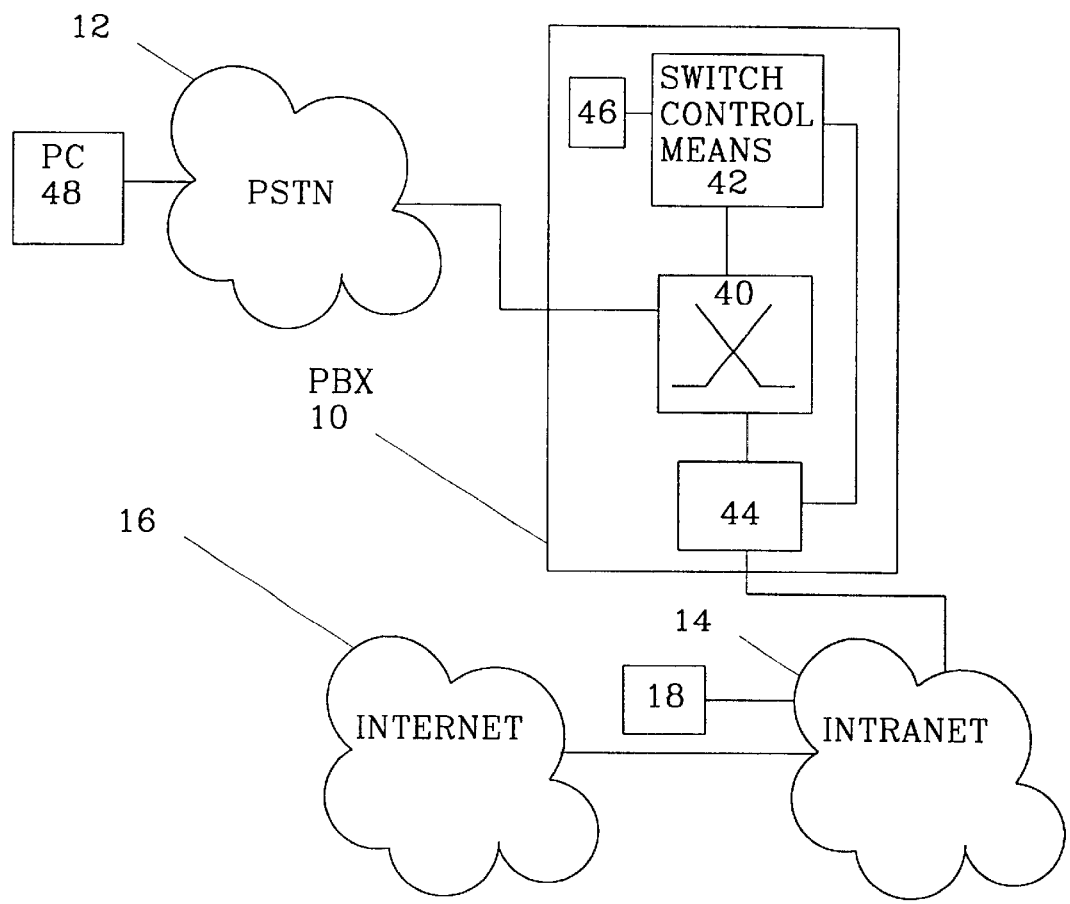
FIG. 1 shows a block schematic of an exchange according to the invention to which a computer is connected.

FIG. 1 shows an exchange PBX 10 connected between a public switched telephone network 12 (PSTN) and a computer network 14 in the form of an intranet. The intranet 14 is in turn connected to another computer network 16 in the form of internet. A server 18 is also connected to the intranet 14. The PBX 10 comprises a switch core 40 connected to the PSTN 12 and a network connection device 44 connected between the switch core 40 and the intranet 14. A switch control means 42 is connected to both the switch core 40 and the network connection device 44. The switch control means 42 comprises a first means 46 for monitoring connections set up via the network connection device 44. A computer PC 48 is connected to PSTN 12 in order to get a data connection to the intranet 14 and possibly the internet 16 via the PBX 10. The intranet could be implemented on some local network such as a LAN (Local Area Network) of the type Ethernet or Token Ring. The network would in any case comprise at least one router for connecting the computer network 14 to other computer networks such as in this example Internet 16 so that the user can connect himself to the Internet 16.

The connection between the PSTN 12 and the switch core 40 is preferably in the form of a trunk line. On such a trunk line digital telecommunication signals in the form of PCM signals are transported in frames and time slots in a manner known to the person skilled in the art. PCM stands for Pulse Code Modulation. The computer 48, which can be a personal computer PC, is connected to a modem (not shown) in order to provide a computer link over the PSTN 12.

The exchange 10 can comprise several network connection devices 44 in order to provide the possibility to connect a large number of computers or several separate computer networks.

Figure 2:
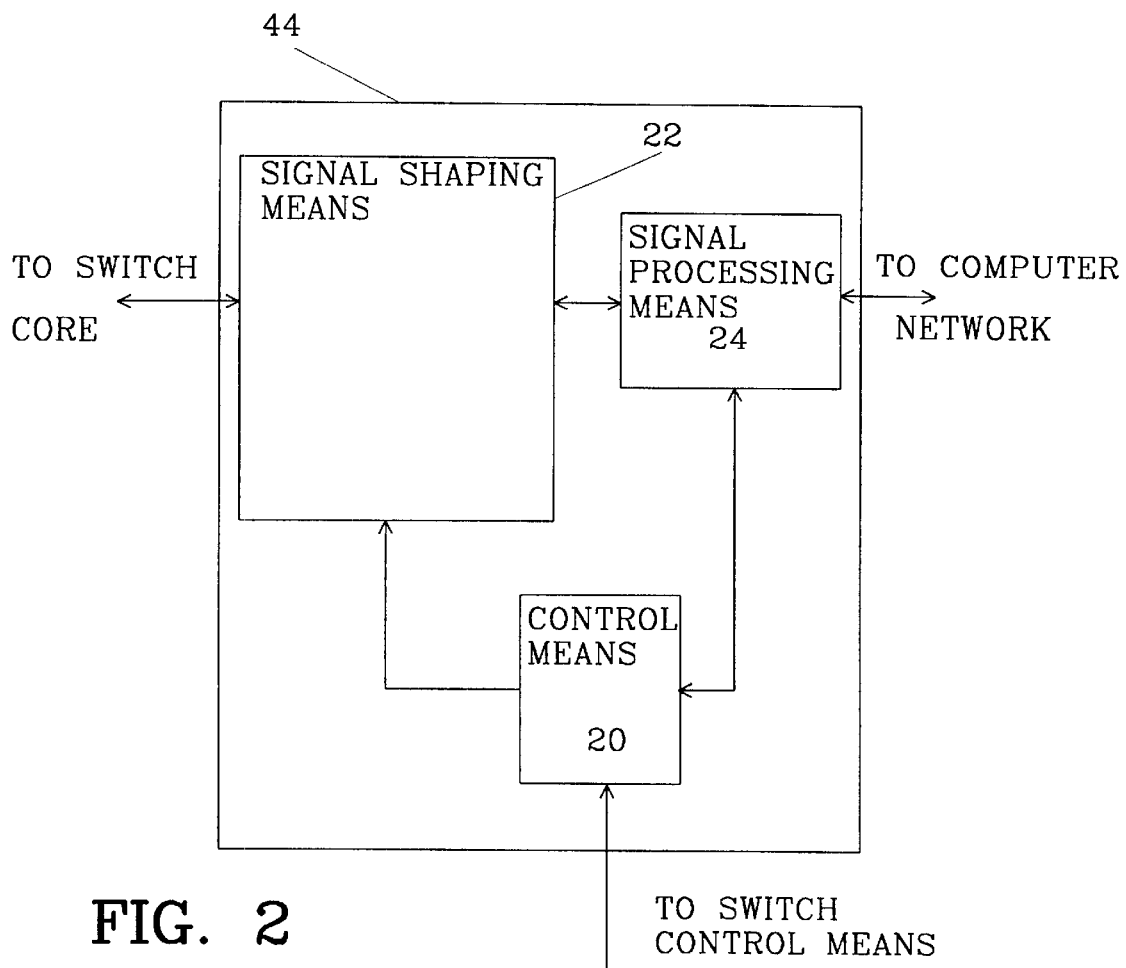
FIG. 2 shows a block schematic of a computer network connection device in the exchange of FIG. 1.

FIG. 2 shows a block schematic of a network connection device 44 according to the invention. The network connection device includes at least one signal shaping means 22, a local control means 20 and a signal processing means 24. The signal shaping means 22 is connected between the switch core and the signal processing means 24, which in turn is connected to the intranet 14. The local control means 20 is connected to and controls both the signal shaping means 22 and the signal processing means 24.

It is also connected to the switch control means 42 of the exchange.

Figure 3:
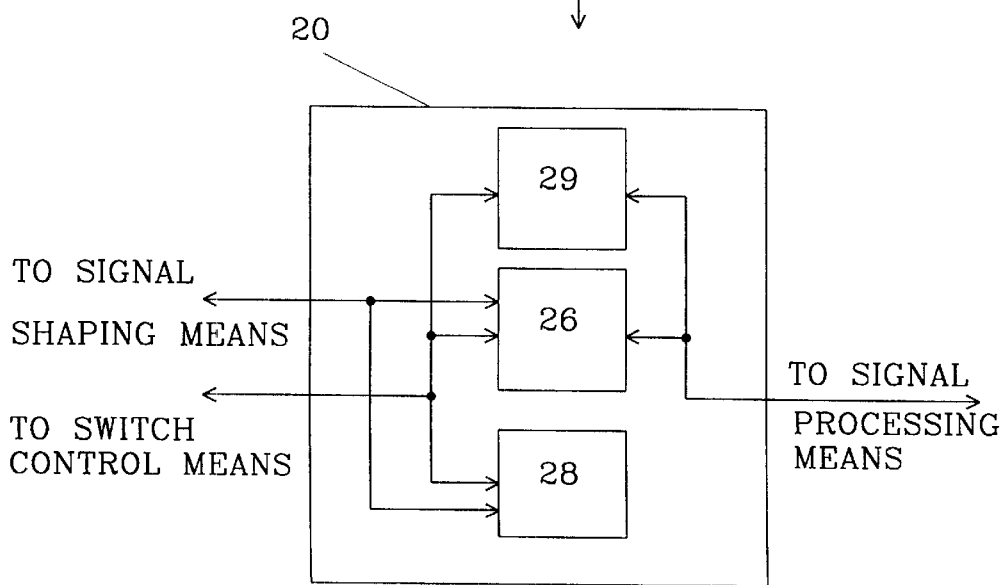
FIG. 3 shows a block schematic in more detail of a local control means in the network connection device.

FIG. 3 shows the local control means 20 in greater detail. The local control means 20 comprises a means for access control 26, which is connected to the signal shaping means 22, the signal processing means 24 and the switch control means 42, a means for selecting demodulation 28, which is also connected to the signal shaping means 22 and the switch control means 42 as well as a second means 29 for monitoring connections' also connected to the signal processing means 24 and the switch control means 42.

Figure 5:
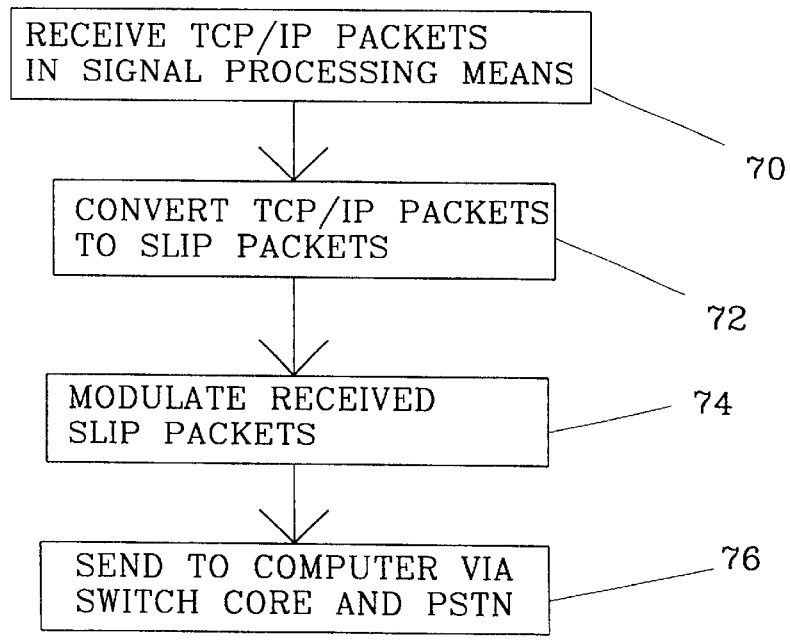
FIG. 5 shows a flow chart of a method of receiving data from the computer network and sending it to the computer.
Figure 4:
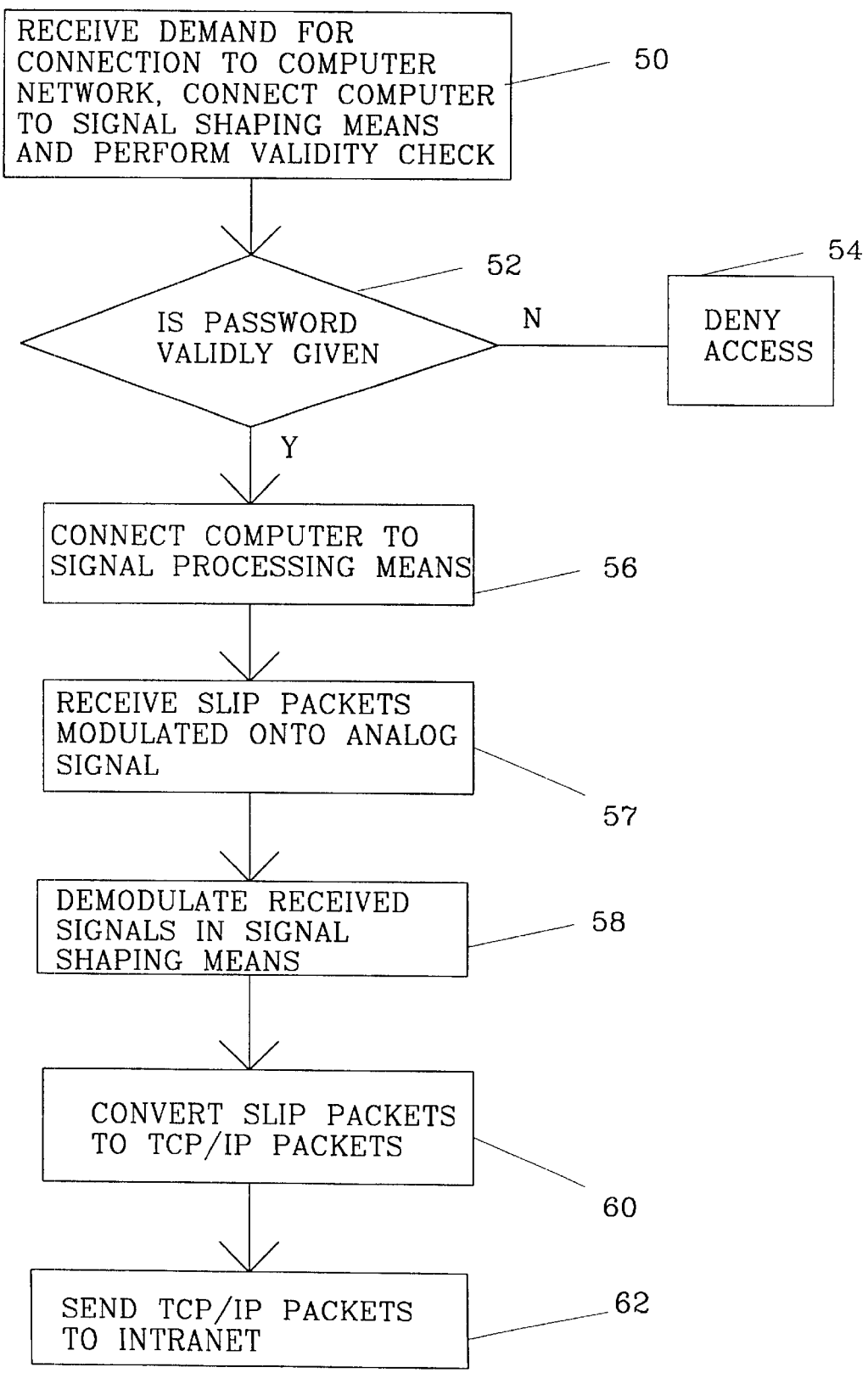
FIG. 4 shows a flow chart of a method of connecting a computer to a computer network via the exchange according to the invention.

FIG. 4 shows a flowchart of a method used for connecting the computer to the intranet via the exchange and FIG. 5 shows a flow chart of a method of receiving data from the intranet and sending it to the computer.

The way the system according to the invention works will now be described with reference to FIGS. 1, 2, 3, 4 and 5.

A user has a computer 48 at home, which is connected to the public telecommunication network 12 via his modem, which computer he wants to connect to the internet 16 via the intranet 14. He therefore dials a special number through which he will get access to the internet via the exchange 10. By dialling this special number the user demands a connection to the computer network. This special number is, in the switch control means 42, directly associated with the network connection device 44. The switch control means 42 therefore immediately sets up a connection to the signal shaping means 22, which gets connected to the local control means 20. The setting up of a connection through the exchange under the control of the switch control means 42 is performed in a manner known to the person skilled in the art. The local control means 20 comprises means for access control 26, which means performs a validity check or a check for the right to access, procedural step 50. In this validity check the user is asked to indicate a username he has been allocated, a password for that username and the selected service, like desired protocol for transmitting data packets over a telecommunication line, for example SLIP (Serial Line Internet Protocol) or PPP (Point-to-Point Protocol). If the password is not validly given, i.e. does not correspond to the username, procedural step 52, access to the intranet 14 and internet 16 is denied, procedural step 54. If the password was however validly given, procedural step 52, which is done by the local control means 20 comparing the given password with a password stored for that username in a store (not shown) provided in the access control means 26, the signal shaping means gets connected to the signal processing means 22 by the access control means 26 in the local control means 20, procedural step 56.

In dependence of the answer given by the user in relation to service in the validity check, the local control means 20 then sets the signal processing means 24 to remove the signal structure used by the computer 48 and replace it with the structure used by the computer network. In this example the computer uses the SLIP signal structure and the computer network uses TCP/IP. The demodulation method used by the signal shaping means 22 is selected through handshaking between the signal shaping means 22 and the modem. The switch control means 42 therefore informs the local control means of which demodulation method is to be used and the means for selecting demodulation 28 in the local control means 20 in turn sets the signal shaping means 22 to apply that demodulation method, which can be according to one of several known modulation standards, such as V.34.

The validity check can be varied in a number of ways. It is not necessary for the network connection device 44 to perform it, it can just as well be performed by the switch control means 42, for example in the form of DISA (Dial In Service Access). In this case the special number the user dials includes an access code and the connection is set up in dependence of this code. This validity check in the switch control means 42 can also be combined with the validity check in the network connection device 44. The timing of the validity check can also be varied. It can be performed prior to connecting the user to the signal processing means 24, after such connection or be performed both before and after. It can also be performed before connection the the computer to the signal shaping means.

Yet another variation is that the means for access control 26, which thus can be arranged in the switch control means as well as in the local control means, can get the information about password and other information needed validity checking from the server 18 in the intranet 14 instead of from a memory in the local control means 20 of the network connection device.

There might finally be different access possibilities for different users, some might only be allowed access to the intranet 14, while some might get access to both the intranet 14 and the internet 16. Another possibility is that access to certain computers on the intranet containing confidential information is restricted. The access to such restricted computers could be based on the number dialled and/or an access code and enforced by denying connection to specific IP address.

The system system according to the invention could also be provided with a firewall router between the internet and the intranet in order to only let some things through from the company to the internet and vice versa. This might be important in order to avoid persons from outside the company getting access to above mentioned computers.

Returning now to our user having his computer 48 connected to the signal processing means 24, he now has access to at least the intranet 14 and also the internet 16. He therefore sends data packets having the SLIP structure modulated onto an analog signal, which analog signal incidentally has been transformed to digital signals. These digital signals are received in the signal shaping means 22, procedural step 57, where they are demodulated, procedural step 58. Thereafter these demodulated data signals are sent from the signal shaping means 22 to the signal processing means 24, where each data packet having the SLIP or PPP protocol is converted to at least one data packet suitable for use on the intranet 14, procedural step 60. The protocol used is TCP/IP. Thereafter the data packet with the protocol TCP/IP is sent to the intranet, procedural step 62. The packet can be sent further to the internet 16 if such a connection is desired by the user and he has that access possibility.

The above description applies to a telecommunication system having partly analog lines. In a digital system like ISDN, the signal shaping means 22 would not be needed and could therefore be left out. An alternative would be that the local control means would be arranged to let ISDN signals pass through the signal shaping means unharmed. This could again be achieved through the number used for dialling the exchange or through some interrogation scheme or the signalling used.

Different A- and B-numbers used in signalling can also be used to indicate if the signals are originating from a system having analog connections to the users or digital.

There are of course data packets sent in the other direction from the computer network 14 to the computer 48 of the user. These packets have an address that is associated with the network connection device in question. A network connection device, when setting up a connection, associates a computer network address belonging to the network connection device with the computer 48 or rather with the connection set up with the computer. Different addresses are associated with different connections. What happens, with reference to FIG. 5, is that data packets having said address are received from the intranet 14 in the signal processing means 24, procedural step 70. There the packets get converted from TCP/IP packets to SLIP packets, procedural step 72. Thereafter the converted packets get modulated in the signal shaping means 22, procedural step 74, and then sent to the computer via the switch core 40 and PSTN 12, procedural step 76. The modulation method might for example be PSK modulation but must be the method that corresponds to the demodulation method the modem of the user uses.

As mentioned above the network connection device can comprise several signal shaping means 22 each connected to the signal processing means 24. The local control means 20 would then control each signal shaping means. In this way several connections could be set up between the computer and the computer networks 14, 16.

All the functional devices in the network connection device are made in the form of a processor and a memory and this can easily be shared by both these means. Unnecessary signal generations are then avoided.

Apart from the above mentioned features of the network connection device, the exchange can also use the A- and/or B-number analysis function provided in the switch control means in order to permit or deny access to the internet or as mentioned earlier see what kind of service is required. The local control means can also have some timing function in order to calculate the time a user is connected to the computer network. This information can then be used for billing purposes.

During all these previously described activities the switch control means and the local control means are monitoring the functioning of the network connection device. This monitoring is at least partly performed by controlling the network addresses used. These addresses are updated when for example changes of a corporate network is done.

Other monitoring functions, which are incorporated in the first monitoring means 46 in the switch control means 42 are logging of problems on the computer network that disrupts the telecommunication traffic, such as not receiving packets, and generation of alarms if these problems reach a certain level, disconnection of faulty network connection devices, restarting of network connection devices and connection of a reserve network connection device instead of a faulty one. Examples of such problems are if a number of packets not received during a period of time are equal to a certain amount of packets, the number of distorted packets are higher than a certain level etc. Other functions are keeping of statistics of the quality, like lost packets, failed connections etc. The software in the local control means can be updated at the same time as when other software in the exchange is updated.

Other functions are traffic measurements, such as how many bytes are sent in total and divided onto IP addresses and the time connections are set up as well as to which servers connections have been set up. These functions are preferably performed in the second monitoring means 29 in the local control means of the network connection device 44.

By monitoring channels an exchange can, in dependence of alarms, reroute and/or deny connections through the computer network. The monitoring functions can be performed wholly in the switch control means, in the local control means of the network connection device or in both the switch control means and in the local control device.

The invention is of course not limited to the embodiments described above and shown in the drawings but can be modified within the scope of the enclosed claims.

What is claimed is:

1. A telephone exchange for connection of a computer to a computer network via a telecommunication network the telephone exchange comprising
   a switch core;
   a switch control means responsible for setting up connections between users of the telephone exchange;
   at least one network connection device, in said telephone exchange, that is connected between the switch core and the computer network wherein the network connection device comprises a signal processing means that is arranged to convert the signal structure of data signals, received from a computer via the telecommunication network and the switch core, to data packets having a signal structure suitable for data communication and to supply these data packets to the computer network; and
   means for monitoring every connection set up between the computer and the computer network, wherein said means for monitoring is connected to said at least one network connection device.

2. A telephone exchange according to claim 1, wherein the means for monitoring is arranged to monitor faults occurring when sending data packets to and from the network connection device and generate alarms if such faults occur.

3. A telephone exchange according to claim 1, wherein the switch control means or the network connection device comprises means for access control for at least some of the connections set up.

4. A telephone exchange according to claim 3, wherein a number used by the computer in dialing the exchange comprises an access code and the means for access control only connects the computer to the computer network if the access code corresponds to a correct code for the number dialed.

5. A telephone exchange according to claim 3, wherein the means for access control requests a password from the computer and allows the computer access to the computer network if that password is correct.

6. A telephone exchange according to claim 1, wherein the signal processing means is connected to the switch core via at least one signal shaping means arranged to demodulate modulated computer signals which have been supplied from said computer.

7. A telephone exchange according to claim 6, wherein the network connection device comprises means for selecting a type of demodulation or no demodulation for signals received from the computer.

8. A telephone exchange according to claim 1, wherein the network connection device comprises means for immediately selecting service in dependence of a number used by the computer when connecting to the exchange.

9. A telephone exchange according to claim 3, wherein the network connection device comprises means for access control in order to interrogate the computer before the connection is set up.

10. A telephone exchange according to claim 9, wherein the means for access control is arranged to interrogate the computer for at least one of the following details: username, password and desired protocol, and to set up the connection to the computer network in dependence of the answer to the interrogation.

11. A telephone exchange according to claim 1, wherein the means for monitoring is arranged to monitor the set up of the connection and the quality of the connection to the computer network.

12. A telephone exchange according to claim 1, wherein the switch control means comprises the means for monitoring.

13. A telephone exchange according to claim 1, wherein local control means comprises the means for monitoring.

14. Telephone exchange for connection of a computer to a computer network via a telecommunication network the telephone exchange comprising:
   a switch core;
   a switch control means responsible for setting up connections between users of the exchange;
   at least one network connection device, in said telephone exchange, that is connected between the switch core and the computer network wherein the network connection device comprises a signal processing means that is arranged to receive data packets having a signal structure suitable for data communication from the computer network, to convert the signal structure of these data packets to a signal structure suitable for communication of data over a telecommunication network and to supply the converted signals to a computer via the switch core and the telecommunication network; and
   means for monitoring every connection set up between the computer and the computer network, wherein said means for monitoring is connected to the at least one network connection device.

15. Telephone system comprising an exchange and, a server for connection of a computer to a computer network via a telecommunication network, wherein the exchange comprises;

a switch core;

a switch control means responsible for setting up connections between users of the exchange;

at least one network connection device, in said exchange, that is connected between the switch core and the computer network wherein the network connection device comprises a signal processing means that is arranged to convert the signal structure of data signals, received from a computer via the telecommunication network and the switch core, to data packets having a signal structure suitable for data communication and to supply these data packets to the computer network, and means for monitoring every connection set up between the computer and the computer network, wherein said means for monitoring are connected to the at least one network connection device, and the server together with the switch control means or the network connection device comprises means for access control for at least some of the connections set up.

16. Telephone system according to claim 15, comprising a computer network that connects the exchange with a server.

17. Telephone system comprising an exchange and a server for connection of a computer to a computer network via a public switched telephone network, wherein the exchange comprises:

a switch core;

a switch control means responsible for setting up connections between users of the exchange;

at least one network connection device, in said exchange, that is connected between the switch core and the computer network, wherein the network connection device comprises a signal processing means that is arranged to receive data packets having a signal structure suitable for data communication from the computer network, to convert the signal structure of these data packets to a signal structure suitable for communication of data over the public switched telephone network and to supply the converted signals to a computer via the switch core and the public switched telephone network, and means for monitoring every connection set up between the computer and the computer network, wherein said means for monitoring is connected to the at least one network connection device, and the server together with the switch control means or the network connection device comprises means for access control for at least some of the connections set up.

18. Method of connecting a computer to a computer network via a telephone exchange comprising the steps:

receiving, in the telephone exchange, data signals sent from the computer, wherein the data signals are sent from the computer over a public switched telephone network;

converting, by a signal processing means in a network connection device, the signal structure of the data signals to data packets having a signal structure suitable for data communication;

supplying these data packets to the computer network;

monitoring, by a local control means in the network connection device in the telephone exchange, every connection set up between a computer and the computer network.

19. Method according to claim 18, wherein the step of monitoring comprises monitoring of faults occurring when sending data packets to and from the network connection device and generating alarms if such faults occur.

20. Method according to claim 18, comprising the further step of controlling the right to access for at least some of the connections set up.

21. Method according to claim 20, wherein the number used by a computer in dialing the exchange comprises an access code and the step of controlling of right to access comprises connecting the computer to the computer network only if the access code corresponds to a correct code for the number dialled.

22. Method according to claim 20, wherein at least part of the controlling of the right to access is performed by interrogating the computer for a password and only allowing the user access if that password is correct.

23. Method according to claim 18, further comprising the step of demodulating the data signals from the computer.

24. Method according to claim 23, further comprising the step of choosing a type of demodulation or no demodulation for signals received from the computer.

25. Method according to claim 18, further comprising the step of immediately selecting service in dependence of the number used by the computer when dialing the exchange for a connection to the computer network.

26. Method according to claim 18, wherein said step of controlling the right to access comprises the step of interrogating the computer before a connection is set up.

27. Method according to claim 26, wherein the step of interrogating comprises requesting from the computer at least one of the following details: username, password and desired protocol and effecting the connection to the computer network in dependence of the answer to the interrogation.

28. Method according to claim 18, wherein the step of monitoring comprises monitoring of the setting up of the connection and the quality of the connection to the computer network.

* * * * *